US009118119B2

(12) United States Patent
Huang

(10) Patent No.: US 9,118,119 B2
(45) Date of Patent: Aug. 25, 2015

(54) WIRELESS COMMUNICATION DEVICE AND FEED-IN METHOD THEREOF

(75) Inventor: Hsiao-Ting Huang, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 561 days.

(21) Appl. No.: 13/230,861

(22) Filed: Sep. 13, 2011

(65) Prior Publication Data

US 2013/0064149 A1 Mar. 14, 2013

(51) Int. Cl.

*H04W 88/08* (2009.01)
*H04B 7/02* (2006.01)
*H01Q 13/10* (2006.01)
*H01Q 5/335* (2015.01)
*H01Q 5/35* (2015.01)
*H01Q 5/50* (2015.01)

(52) U.S. Cl.

CPC ............... *H01Q 13/10* (2013.01); *H01Q 5/335* (2015.01); *H01Q 5/35* (2015.01); *H01Q 5/50* (2015.01)

(58) Field of Classification Search

USPC .................................. 370/297; 343/702, 895
See application file for complete search history.

(56) References Cited

U.S. PATENT DOCUMENTS

| | | | | |
|---|---|---|---|---|
| 8,421,686 | B2 * | 4/2013 | Soler Castany et al. | 343/702 |
| 2002/0175879 | A1 * | 11/2002 | Sabet et al. | 343/895 |
| 2011/0006861 | A1 * | 1/2011 | White et al. | 333/204 |

* cited by examiner

*Primary Examiner* — Yemane Mesfin
*Assistant Examiner* — Henry Baron
(74) *Attorney, Agent, or Firm* — Winston Hsu; Scott Margo

(57) ABSTRACT

The present invention discloses a wireless communication device including a slot antenna, a radio-frequency (RF) signal processing module for processing an RF signal transmitted or received by the slot antenna, and an RF signal diplexer coupled between the slot antenna and the RF signal processing module for splitting up the RF signal into a first frequency component and a second frequency component during transmission, and synthesizing the RF signal corresponding to the first frequency component and the second frequency component during reception.

12 Claims, 7 Drawing Sheets

WIRELESS COMMUNICATION DEVICE AND FEED-IN METHOD THEREOF

BACKGROUND OF THE INVENTION

1. Field of the Invention

The present invention relates to a wireless communication device and feed-in method thereof, and more particularly, to a wireless communication device and feed-in method thereof for dual band transmission and reception.

2. Description of the Prior Art

Electronic products with wireless functions, such as wireless access points (APs) and laptops, transmit and receive radio-frequency (RF) signals through antennas to exchange wireless signals and access wireless network. Therefore, for facilitating users to access wireless network more easily, an ideal antenna should cover more frequency bands and size of the antenna should be reduced to meet a trend of light weight and small size of the electronic products.

A slot antenna is widely used in a conventional wireless device, and has a slot for resonating a single frequency band. However, if a wireless device requires operations of dual frequency bands, e.g. to conform to the IEEE 802.11a/b/g standards at the same time, it takes two single slot antennas to meet such a requirement, which increases antenna area and thus increases size of the wireless device. Moreover, if microstrip lines of the two single slot antennas are connected together to form a single feed-in point, the two single slot antennas influence each other, resulting in frequency shift phenomenon on both of the slot antennas. As a result, a signal diplexer is needed for solving frequency shift phenomenon. Furthermore, a conventional signal diplexer is formed by capacitors and inductances, which also increases the production cost.

As known from the above, there is a need to improve the conventional slot antenna to achieve a dual-band slot antenna to meet a trend of small size and low cost of the wireless electronic products.

SUMMARY OF THE INVENTION

It is therefore an object of the present invention to provide a wireless communication device and feed-in method for dual band transmission and reception.

The present invention discloses a wireless communication device including a slot antenna which includes a first feed-in terminal and a second feed-in terminal, a radio-frequency (RF) signal processing module for processing an RF signal transmitted or received by the slot antenna, and an RF signal diplexer coupled between the slot antenna and the RF signal processing module for splitting up the RF signal into a first frequency component and a second frequency component during transmission, and synthesizing the RF signal corresponding to the first frequency component and the second frequency component during reception, the RF signal diplexer includes a first feed-in network coupled between the first feed-in terminal of the slot antenna and the RF signal processing module for transmitting the first frequency component of the RF signal and attenuating the second frequency component of the RF signal, and a second feed-in network coupled between the second feed-in terminal of the slot antenna and the RF signal processing module for attenuating the RF signal corresponding to a first frequency component and transmitting the RF signal corresponding to a second frequency component.

The present invention further discloses a feed-in method for a slot antenna including a first radiating element corresponding to a first frequency component of a radio-frequency signal and a second radiating element corresponding to a second frequency component of the RF signal, the feed-in method includes adjusting a first feed-in network such that a first input impedance of the first feed-in network matches with the first radiating element and mismatches with the second radiating element, and adjusting a second feed-in network such that a second input impedance of the second feed-in network matches with the second radiating element and mismatches with the first radiating element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
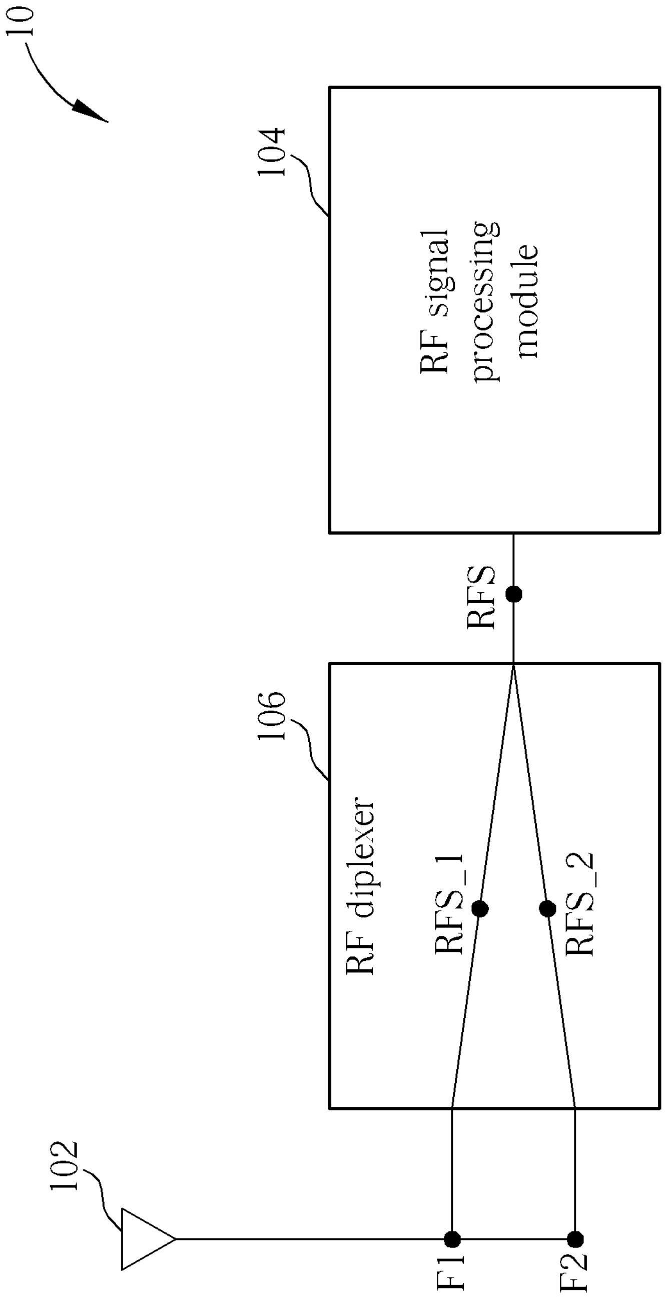
FIG. 1 is a schematic diagram of a wireless communication device according to an embodiment of the present invention.

Please refer to FIG. 1, which is a schematic diagram of a wireless communication device 10 according to an embodiment of the present invention. The wireless communication device 10 can be a wireless access point (AP) as a medium between a local area network (LAN) and other wireless devices, such as laptops and mobile phones etc. The wireless communication device 10 includes a slot antenna 102, a radio-frequency (RF) signal processing module 104, and an RF diplexer 106. The slot antenna 102 is utilized for dual-band operation, and includes feed-in terminals F1 and F2 for receiving and transmitting an RF signal RFS, which may comply with IEEE 802.11a/b/g wireless modulation standards, for example. The RF signal processing module 104 is used for processing the RF signal RFS transmitted or received by the slot antenna 102. The RF diplexer 106 is coupled between the slot antenna 102 and the RF signal processing module 104, for splitting up the RF signal RFS into frequency components RFS_1 and RFS_2 during transmission, and synthesizing the frequency components RFS_1 and RFS_2 into the RF signal RFS during reception. In such a situation, the wireless communication device 10 can perform dual-band transmission and reception with the single one slot antenna 102.

More specifically, when the RF signal processing module 104 transmits the RF signal RFS, the RF signal RFS is split into the frequency component RFS_1, e.g. 5.45 GHz, and the frequency component RFS_2, e.g. 2.45 GHz, through the RF diplexer 106. Then, the RF diplexer 106 transmits the frequency components RFS_1 and RFS_2 to the feed-in terminals F1 and F2 respectively, and the slot antenna 102 radiates the frequency components RFS_1 and RFS_2 to the air. On the other hand, when receiving the frequency component RFS_1 and RFS_2 of the RF signal RFS, the RF diplexer 106 synthesizes the frequency component RFS_1 and RFS_2 into the RF signal RFS, and the RF signal processing module 104 accordingly performs related signal processing on the RF signal RFS, such as demodulation and decoding, etc. As can be seen, the wireless communication device 10 performs dual-band transmission and reception with the single slot antenna 102; thus, antenna area and production cost can be saved.

Figure 2:
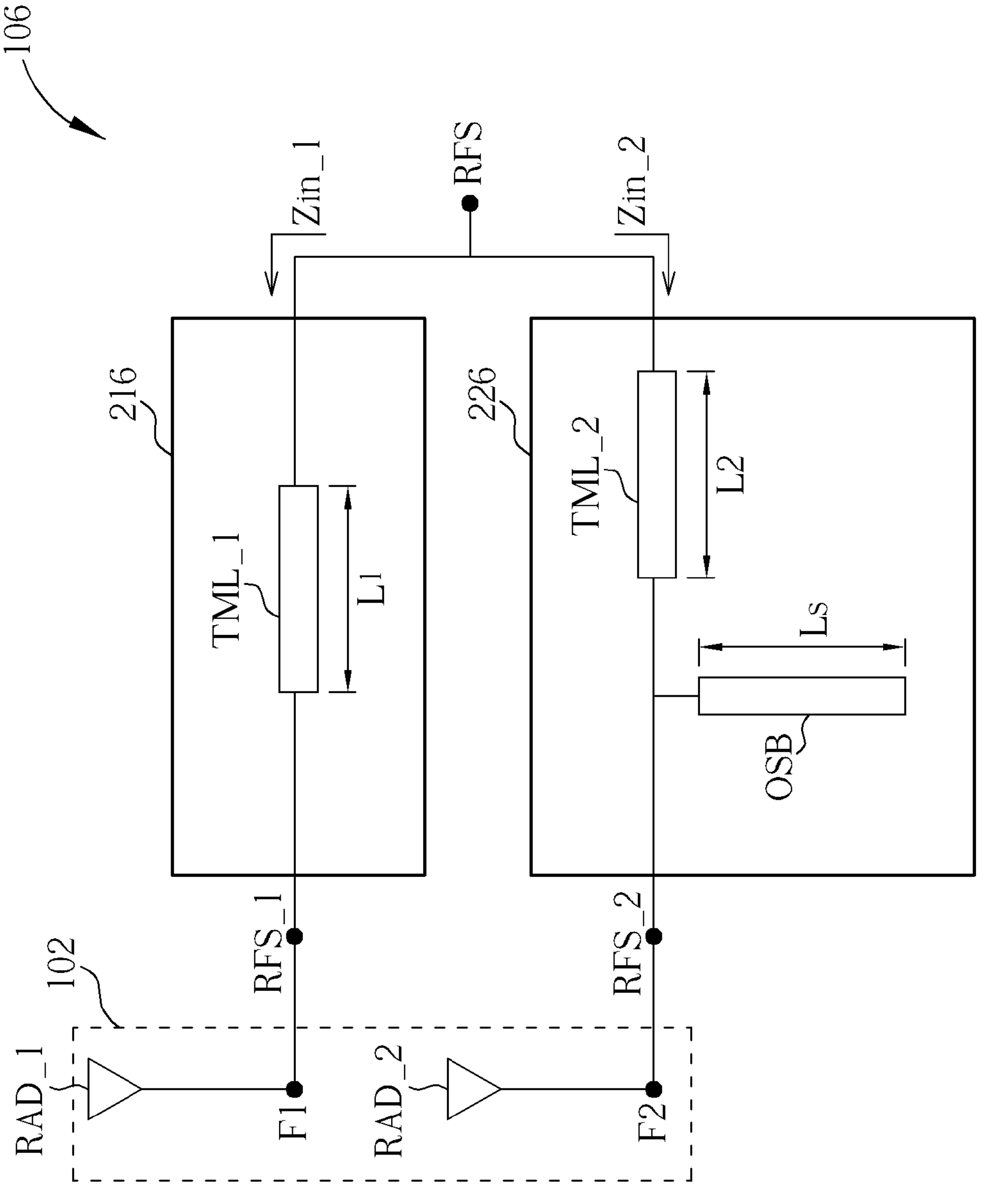
FIG. 2 is a schematic diagram of the RF diplexer shown in FIG. 1 according to an embodiment of the present invention.

Note that, FIG. 1 is to illustrate the concept of the present invention, and those skilled in the art can make modifications according to different system requirements. For example, if the frequency of the frequency component RFS_1 is substantially twice the frequency of the frequency component RFS_2, e.g. 802.11a versus 802.11b, the RF diplexer 106 as well as the slot antenna 102 can be designed as shown in FIG. 2. In FIG. 2, the slot antenna 102 is composed of radiating elements RAD_1 and RAD_2 for radiating the frequency components RFS_1 and RFS_2 of the RF signal RFS, respectively. The RF diplexer 106 includes feed-in networks 216 and 226 between the feed-in terminal F1 and the RF signal processing module 104 and between the feed-in terminal F2 and the RF signal processing module 104, respectively. The feed-in network 216 determines an input impedance Zin_1 from the RF signal processing module 104 to the radiating element RAD_1, and the feed-in network 226 determines an input impedance Zin_2 from the RF signal processing module 104 to the radiating element RAD_2.

The feed-in network 216 includes a transmission line TML_1 coupled between the feed-in terminal F1 and the RF signal processing module 104, and a length L1 of the transmission line TML_1 equals a quarter wavelength of the frequency component RFS_2. Thus, the feed-in network 216 can transmit the frequency components RFS_1, i.e. 5.45 GHz, and attenuate the frequency component RFS_2, i.e. 2.45 GHz.

The feed-in network 226 includes a transmission line TML_2 and an open stub OSB. The transmission line TML_2 is coupled between the feed-in terminal F2 and the RF signal processing module 104, and a length L2 of the transmission line TML_2 equals a quarter wavelength of the frequency component RFS_1. The open stub OSB is shunted between transmission line TML_2 and the feed-in terminal F2 of the slot antenna 102, and a stub length Ls of the open stub OSB equals the quarter wavelength of the frequency component and RFS_1. In such a situation, the transmission line TML_2 can transmit the frequency components RFS_2, and the open stub OSB can filter out the frequency component RFS_1.

More specifically, a quarter wavelength of 2.45 GHz signal is substantially equal to a half wavelength of 5.45 GHz signal. Thus, according to the transmission-line theorem, a transmission line with a length equal to the quarter wavelength of 2.45 GHz signal appears to be an open circuit to the 2.45 GHz signal and to be a short circuit to the 5.45 GHz signal, such that the transmission line can attenuate the 2.45 GHz signal and transmit the 5.45 GHz. In such a situation, since the length L1 of the transmission line TML_1 equals a quarter wavelength of the frequency component RFS_2, i.e. 2.45 GHz, the input impedance Zin_1 determined by the feed-in network 216 matches with the radiating element RAD_1, and mismatches with the frequency component RFS_2. Similarly, since the length L2 of the transmission line TML_2 equals a quarter wavelength of the frequency component RFS_1, and the stub length Ls of the open stub OSB equals a quarter wavelength of the frequency component and RFS_1, the input impedance Zin_2 determined by the network 226 matches with the radiating element RAD_2, and mismatches with the frequency component RFS_1. Therefore, the feed-in network 216 transmits the frequency component RFS_1 and attenuates the frequency component RFS_2; oppositely, the feed-in network 226 transmits the frequency component RFS_2 and attenuates the frequency component RFS_1.

Figure 3:
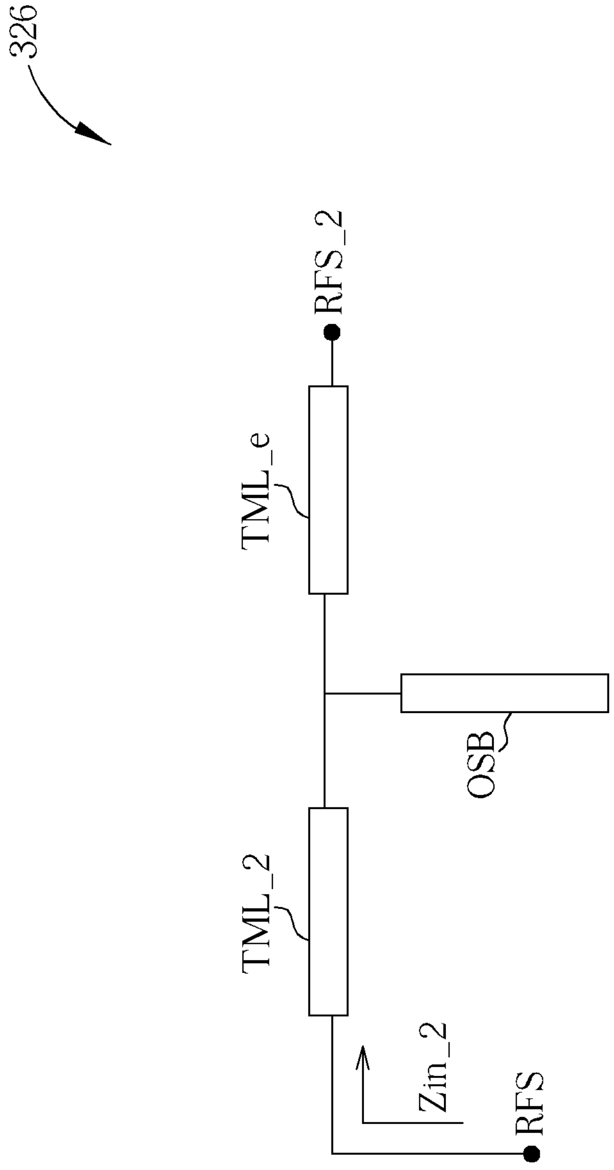
FIG. 3 is a schematic diagram of the feed-in network shown in FIG. 2 according to another embodiment of the present invention.

In addition, the operating frequency of the radiating element RAD_1 or RAD_2 is determined by the current route in the radiating element RAD_1 or RAD_2, and a lower operating frequency requires a longer current route. Thus, the length or size of the radiating element RAD_1 or RAD_2 can affect the operating frequency. In such a situation, the length L2 of the transmission line TML_2 may not be long enough if a distance from the feed-in terminal F2 to the RF signal processing module 104 is substantially a half wavelength of the frequency component RFS_1. For example, if there is substantially a half wavelength of 2.45 GHz between the feed-in terminal F2 and the RF signal processing module 104, a transmission line with a length equal to a quarter wavelength of 5.45 GHz is too short to reach the distance. As a result, please further refer to FIG. 3, which is a schematic diagram of a feed-in network 326 according to an embodiment of the present invention. The feed-in network 326 is utilized for replacing the feed-in network 226 shown in FIG. 2, and has a structure similar to that of the feed-in network 226. Compared to the feed-in network 226, the feed-in network 326 further includes an extending transmission line TML_e cascaded between the transmission line TML_2 and the feed-in terminal F2. A length Le of the extending transmission line TML_e is substantially a quarter wavelength of the frequency component RFS_2, in order to compensating a distance from the feed-in terminal F2 to the transmission line TML_2 and keep the input impedance Zin_2 match with the radiating element RAD_2.

Noticeably, the present invention adjusts the feed-in networks 216 and 226 of the RF diplexer 106, to split up or synthesize the RF signal RFS. Those skilled in the art should make modifications or alterations according to different requirements. For example, methods of adjusting the feed-in networks 216 and 226 are not limited, e.g. combinations of cascading transmission lines and shunting stubs, lengths of transmission line and open stub, and positions of shunted open stubs are not limited, as long as the input impedance Zin_1 matches with the radiating element RAD_1 and mismatches with the radiating element RAD_2, and the input impedance Zin_2 matches with the radiating element RAD_2 and mismatches with the radiating element RAD_1. As a result, the slot antenna 102 can operate in dual band through the feed-in networks 216 and 226 of the RF diplexer 106 without two conventional single band slot antennas, and thus save antenna size and cost of the wireless communication device 10.

Figure 4A:
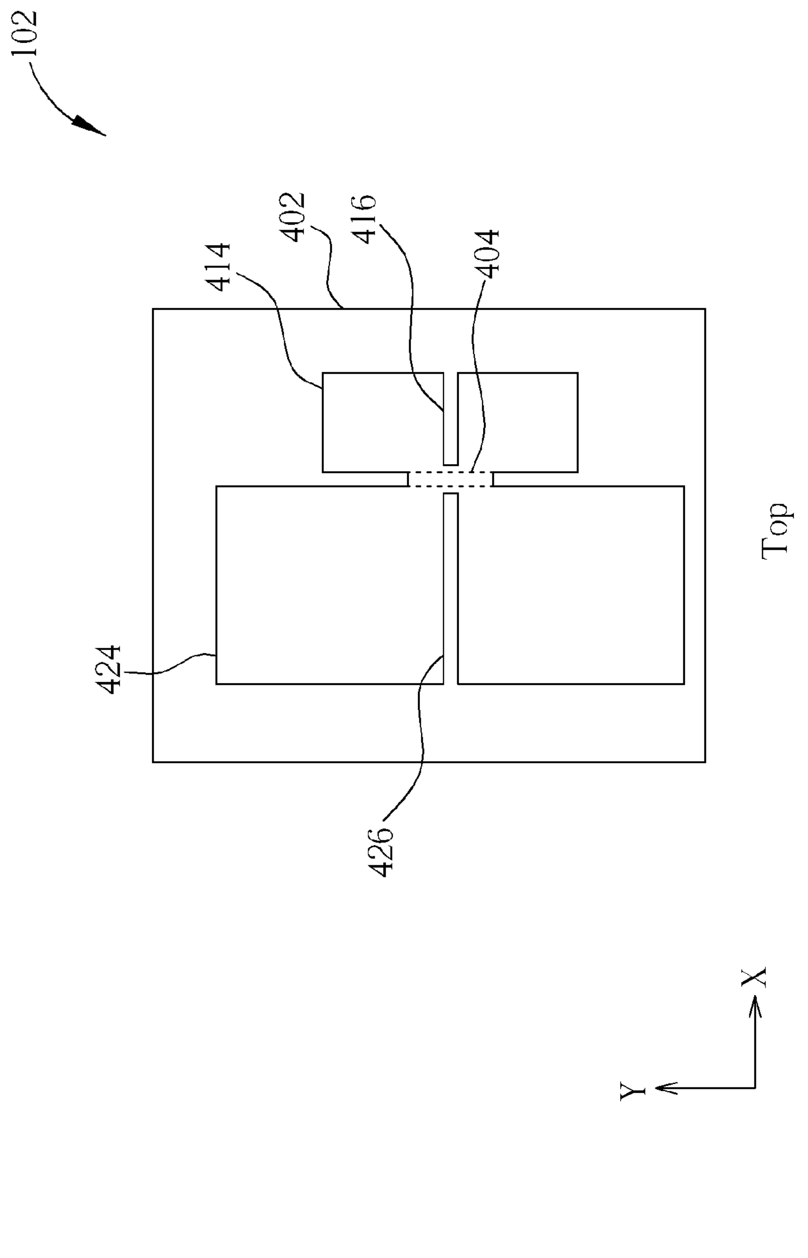
FIG. 4A to 4C are schematic diagrams of top view, bottom view and perspective of the slot antenna shown in FIG. 1, respectively.
Figure 4B:
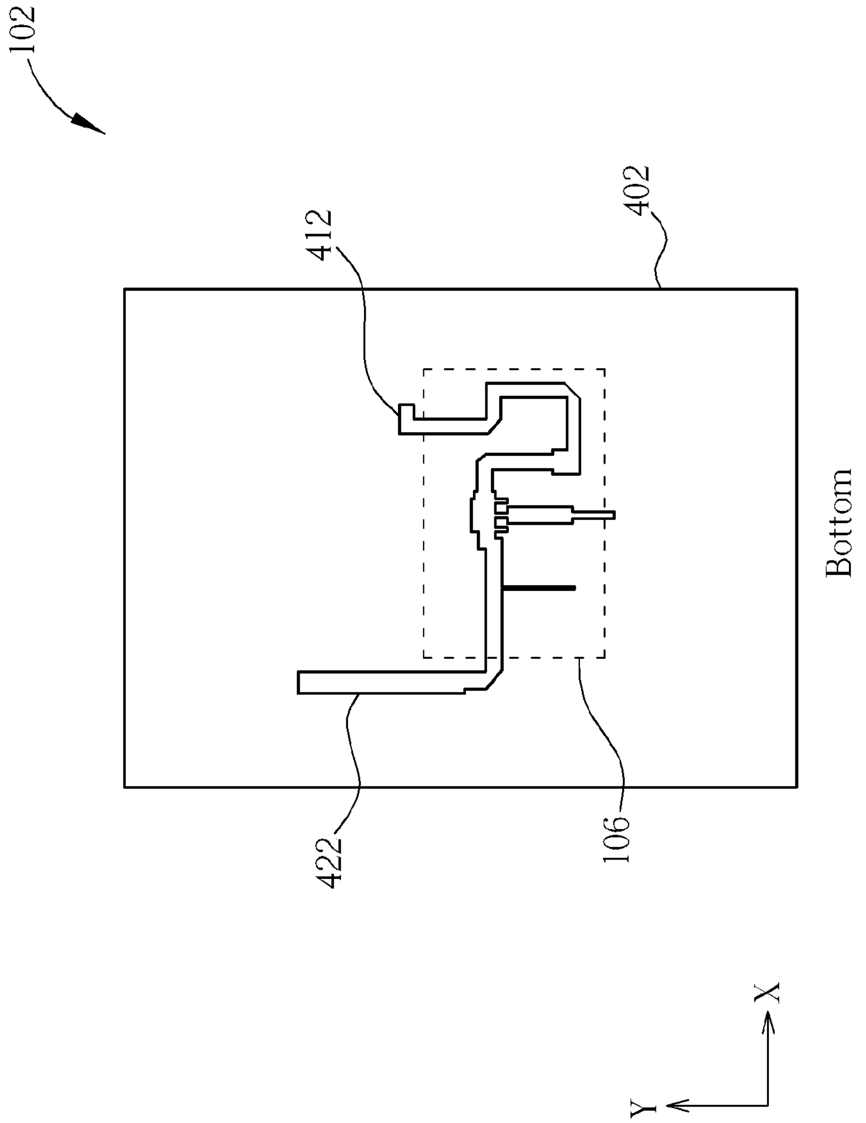
Figure 4C:
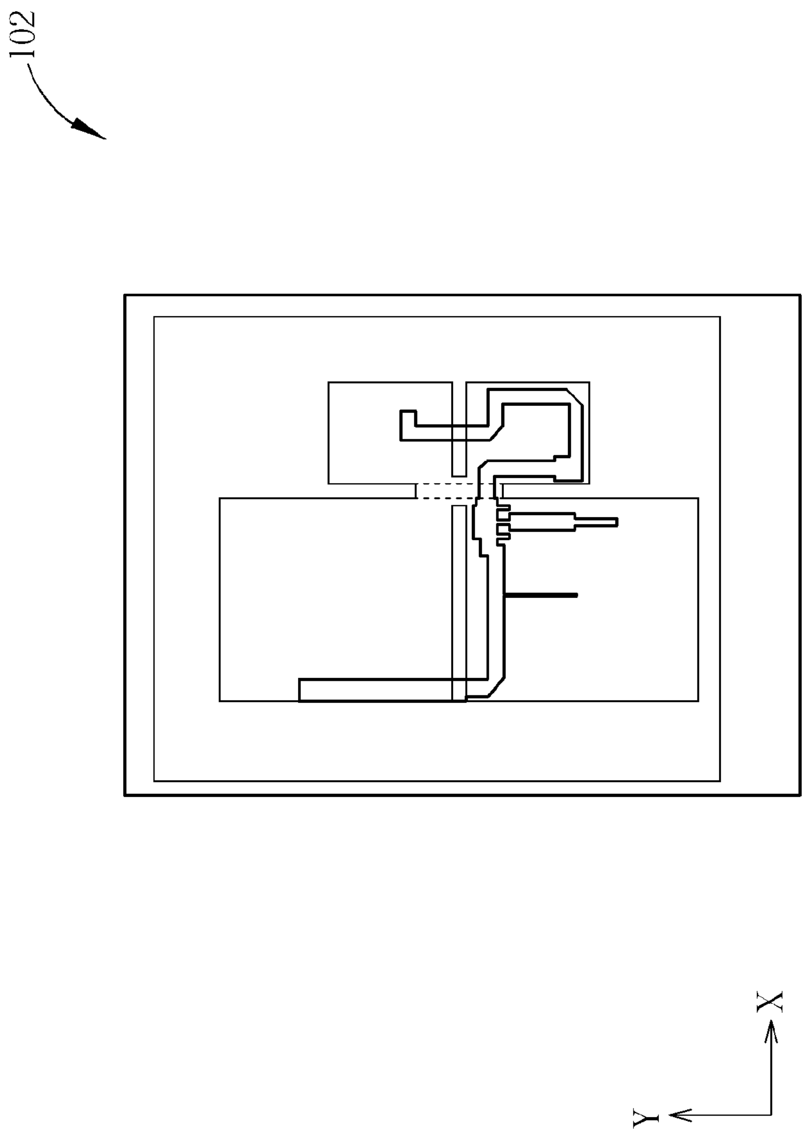

In addition, implementation of the slot antenna 102 is not limited in any rule as long as the slot antenna 102 can accurately receive or transmit the RF signal RFS. For example, FIG. 4A to 4C are schematic diagrams of top view, bottom view and perspective of an embodiment of the slot antenna 102. As shown in FIG. 4A to 4C, the slot antenna 102 includes a substrate 402, feeding microstrip lines 412 and 422, radiating elements 414 and 424, and a connection element 404. The feeding microstrip lines 412 and 422 are formed on a bottom layer of the substrate 402 along a direction Y for transmitting the frequency components RFS_1 and RFS_2, respectively. The radiating elements 414 and 424 are formed on a top layer of the substrate 402 for radiating the frequency components RFS_1 and RFS_2, respectively. The radiating elements 414 and 424 further include slots 416 and 426 formed along a direction X. The connection element 404 is formed on the top layer of the substrate 402 for connecting the radiating elements 414 and 424. Furthermore, the feed-in networks 216 and 226 of the RF diplexer 106 are formed on the bottom layer of the substrate 402. As shown in FIG. 4A, the slot antenna 102 is formed by cutting two conventional single slot antennas by half, which becomes the radiating elements 414 and 424. As shown in FIG. 4C, the slot antenna 102 and RF diplexer 106 both are printed on the top layer and bottom layer of the substrate 402, respectively, which has advantages such as saving area and easy for manufacture. Besides, a conventional diplexer is formed by capacitors and inductances; on the contrary, the present invention realizes the RF diplexer 106 by printed circuit, so as to save cost of the wireless communication device 10.

Figure 5:
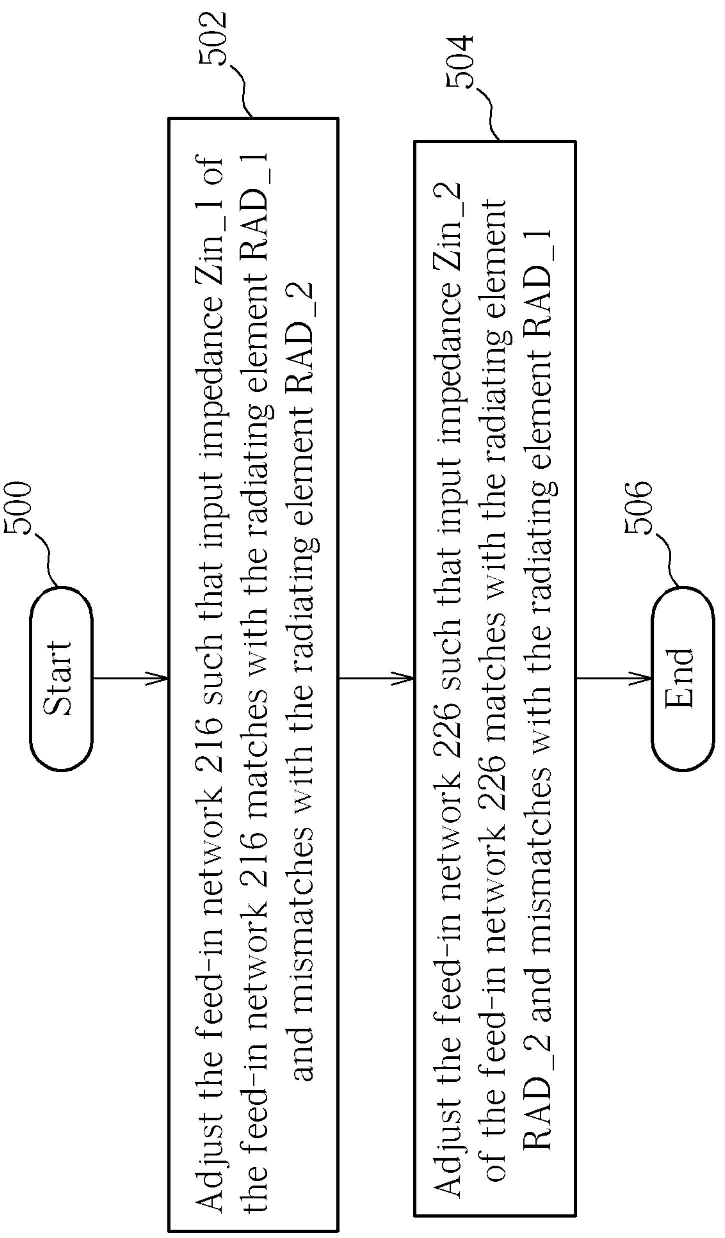
FIG. 5 is a feed-in method according to another embodiment of the present invention.

Operations of the wireless communication device 10 can be summarized into a feed-in method 50 as shown in FIG. 5. The feed-in method 50 includes the following steps:

Step 500: Start.

Step 502: Adjust the feed-in network 216 such that input impedance Zin_1 of the feed-in network 216 matches with the radiating element RAD_1 and mismatches with the radiating element RAD_2.

Step 504: Adjust the feed-in network 226 such that input impedance Zin_2 of the feed-in network 226 matches with the radiating element RAD_2 and mismatches with the radiating element RAD_1.

Step 506: End.

Details of the feed-in method 50 can be derived by referring to the above description.

To sum up, the conventional slot antenna only operates with single frequency band, takes two single slot antennas to achieve dual frequency bands, and thus increases antenna area and cost. The present invention realizes the dual band slot antenna by combining two single band slot antennas and the RF diplexer with a double layer printed circuit board, so as to reduce antenna area and save production cost.

Those skilled in the art will readily observe that numerous modifications and alterations of the device and method may be made while retaining the teachings of the invention.

What is claimed is:

1. A wireless communication device, comprising:

a slot antenna, comprising a first feed-in terminal and a second feed-in terminal, wherein the first feed-in terminal is different from the second feed-in terminal;

a radio-frequency (RF) signal processing module, for processing an RF signal transmitted or received by the slot antenna; and an RF signal diplexer, coupled between the slot antenna and the RF signal processing module, for splitting up the RF signal into a first frequency component and a second frequency component during transmission, and synthesizing the first frequency component and the second frequency component into the RF signal during reception, the RF signal diplexer comprising:

a first feed-in network, coupled between the first feed-in terminal of the slot antenna and the RF signal processing module, for transmitting the first frequency component of the RF signal and attenuating the second frequency component of the RF signal; and a second feed-in network, coupled between the second feed-in terminal of the slot antenna and the RF signal processing module, for attenuating the first frequency component of the RF signal and transmitting the second frequency component of the RF signal.

2. The wireless communication device of claim 1, wherein the first feed-in network comprises:

a first transmission line, coupled to the first feed-in terminal of the slot antenna and the signal processing module, for transmitting the first frequency component of the RF signal and attenuating the second frequency component of the RF signal;

wherein a length of the first transmission line is equal to or greater than a quarter wavelength of the second frequency component.

3. The wireless communication device of claim 1, wherein the second feed-in network comprises:

a second transmission line, coupled to the second feed-in terminal of the slot antenna and the signal processing module, for transmitting the second frequency component of the RF signal and attenuating the first frequency component of the RF signal; and an open stub, shunted between the first transmission line and the slot antenna, for attenuating the first frequency component of the RF signal;

wherein a length of the first transmission line and a length of the open stub are equal to a quarter wavelength of the first frequency component.

4. The wireless communication device of claim 3, wherein the first feed-in network further comprises:

an extending transmission line, cascaded between the open stub and the slot antenna, for extending the second transmission line, to compensate a distance from the second feed-in terminal of the slot antenna to the second feed-in network;

wherein a length of the extending transmission line is substantially equal to the quarter wavelength of the second frequency component.

5. The wireless communication device of claim 1, wherein a first frequency of the second frequency component is substantially twice a frequency of the first frequency component.

6. The wireless communication device of claim 1, wherein the slot antenna further comprises:

a substrate;

a first radiating element, formed on a first layer of the substrate, for transmitting and receiving the first frequency component of the RF signal;

a second radiating element, formed on the first layer of the substrate, for transmitting and receiving the second frequency component of the RF signal;

a connecting bridge, coupled between the first radiating element and the second radiating element, for connecting the first radiating element and the second radiating element;

a first feeding microstrip line, formed on a second layer of the substrate, for transmitting and receiving the first frequency component of the RF signal; and a second feeding microstrip line, formed on a second layer of the substrate, for transmitting and receiving the second frequency component of the RF signal.

7. The wireless communication device of claim 6, wherein the first radiating element and the second radiating element respectively comprise a first slot and a second slot formed along a first direction.

8. The wireless communication device of claim 7, wherein the first feeding microstrip line and the second feeding microstrip line are formed along a second direction perpendicular to the first direction.

9. A feed-in method for a slot antenna comprising a first radiating element corresponding to a first frequency component of a radio-frequency (RF) signal and a second radiating element corresponding to a second frequency component of the RF signal, the feed-in method comprising:

adjusting a first feed-in network such that a first input impedance of the first feed-in network matches with the first radiating element and mismatches with the second radiating element, wherein the first input impedance of the first feed-in network mismatching with the second radiating element attenuates the second frequency component of the RF signal, and wherein the first radiating element is different from the second radiating element; and adjusting a second feed-in network such that a second input impedance of the second feed-in network matches with the second radiating element and mismatches with the first radiating element, wherein the second input impedance of the second feed-in network mismatching with the first radiating element attenuates the first frequency component of the RF signal.

10. The feed-in method of claim 9, wherein the step of adjusting the first feed-in network comprises:

cascading a transmission line to the slot antenna, for transmitting the first frequency component of the RF signal and attenuating the second frequency component of the RF signal.

11. The feed-in method of claim 9, wherein the step of adjusting the second feed-in network comprises:

cascading a transmission line to the slot antenna, for transmitting the second frequency component of the RF signal; and shunting an open stub between the transmission line and the slot antenna, for filtering out the first frequency component of the RF signal.

12. The feed-in method of claim 11, wherein the step of adjusting the second feed-in network further comprises:

cascading an extending transmission line between the transmission line and the slot antenna, for compensating a distance from the second feed-in network to the slot antenna.

* * * * *